March 24, 1925.
W. B. ALLBRIGHT
1,531,060
CONTINUOUS VISCERA AND CARCASS INSPECTION MACHINE
Filed Dec. 26, 1917    5 Sheets-Sheet 4
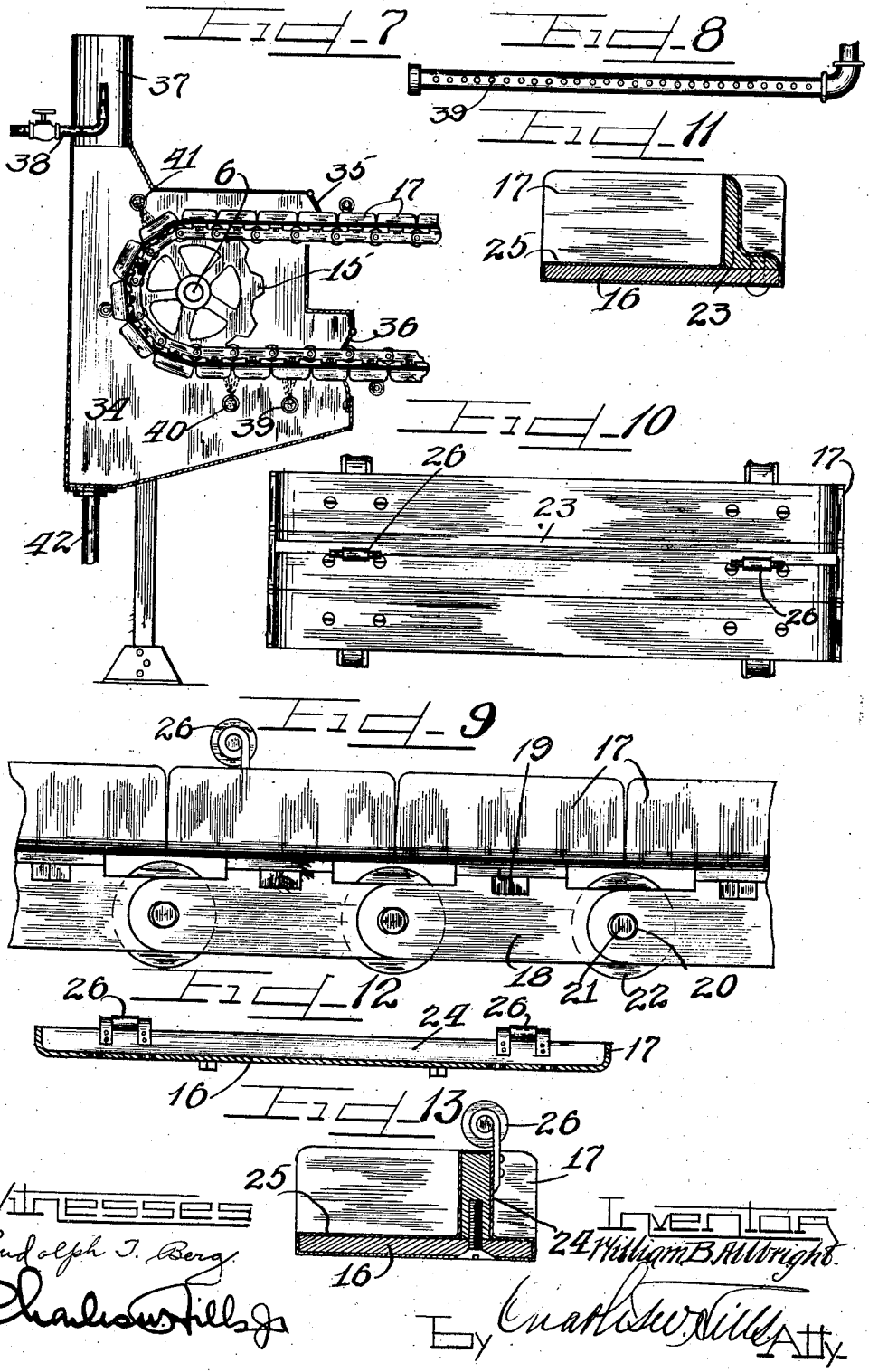

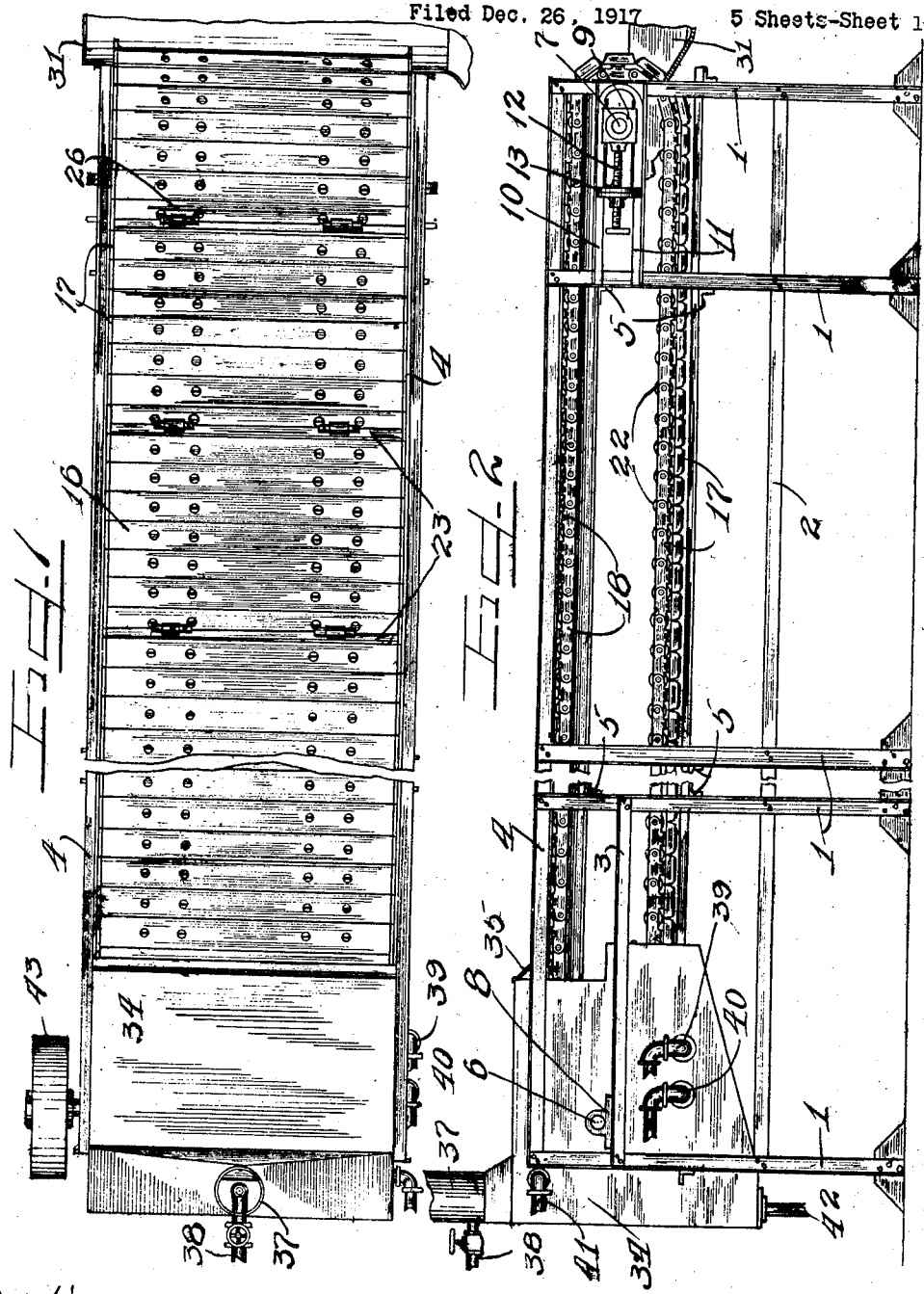

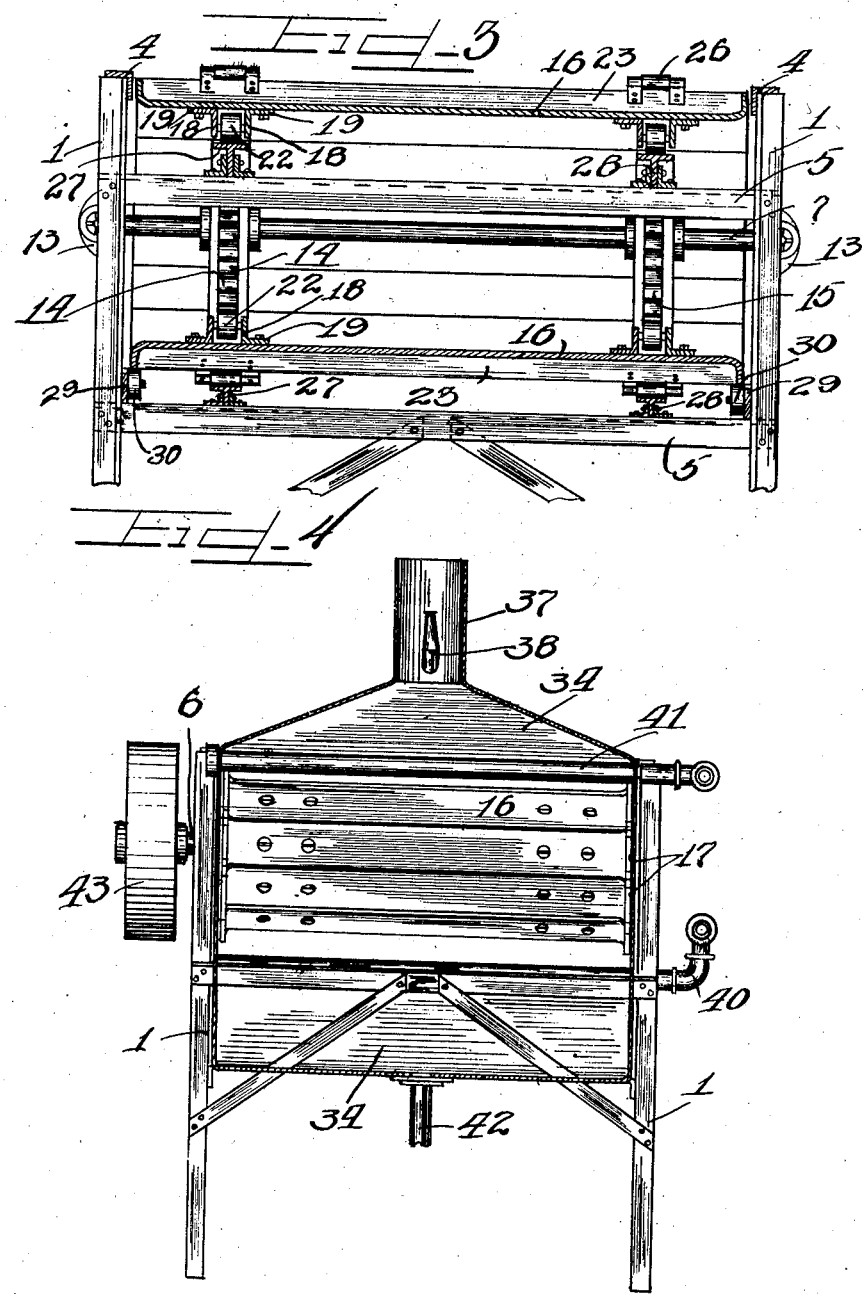

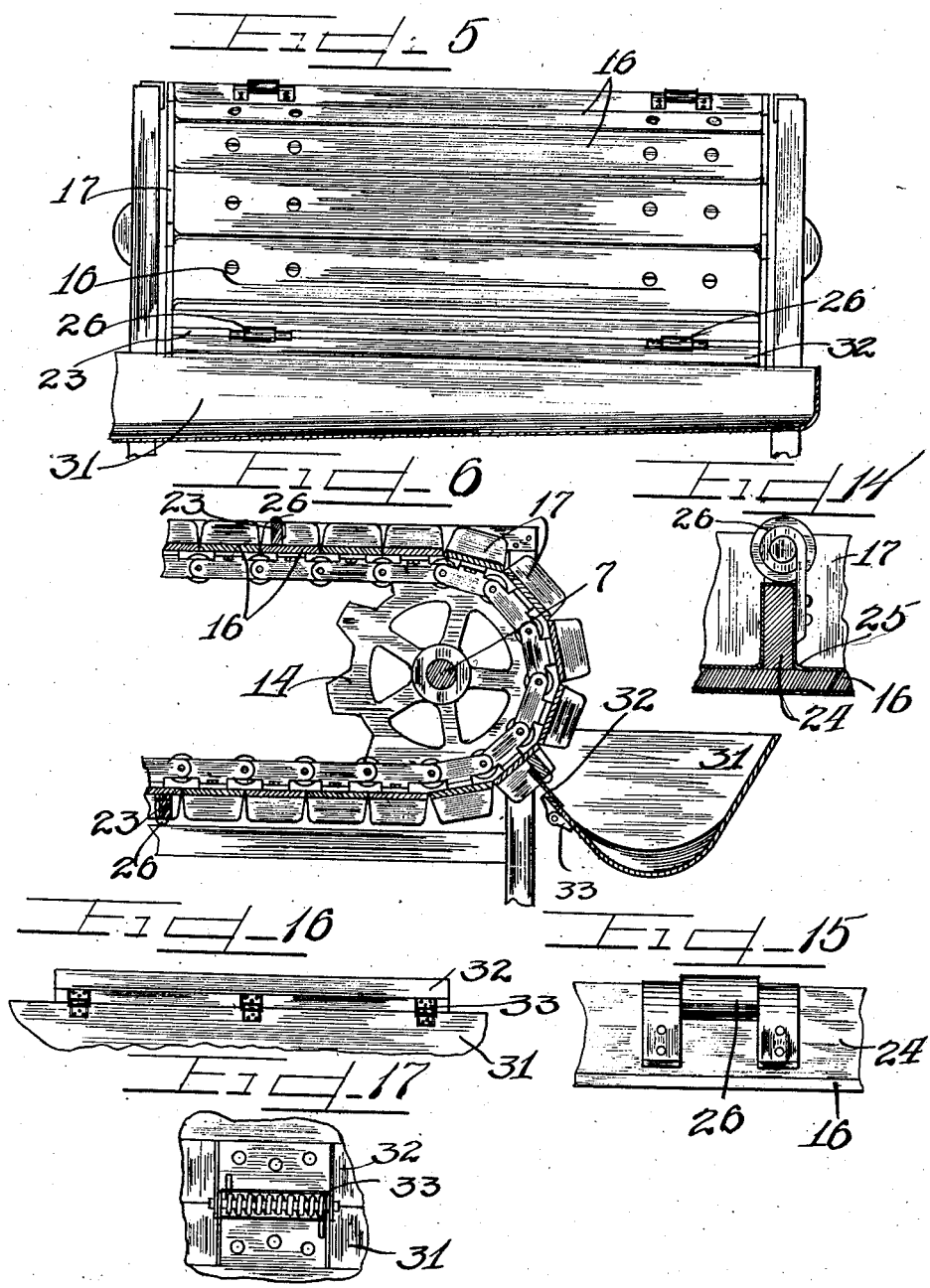

March 24, 1925.
W. B. ALLBRIGHT
1,531,060
CONTINUOUS VISCERA AND CARCASS INSPECTION MACHINE
Filed Dec. 26, 1917    5 Sheets-Sheet 5
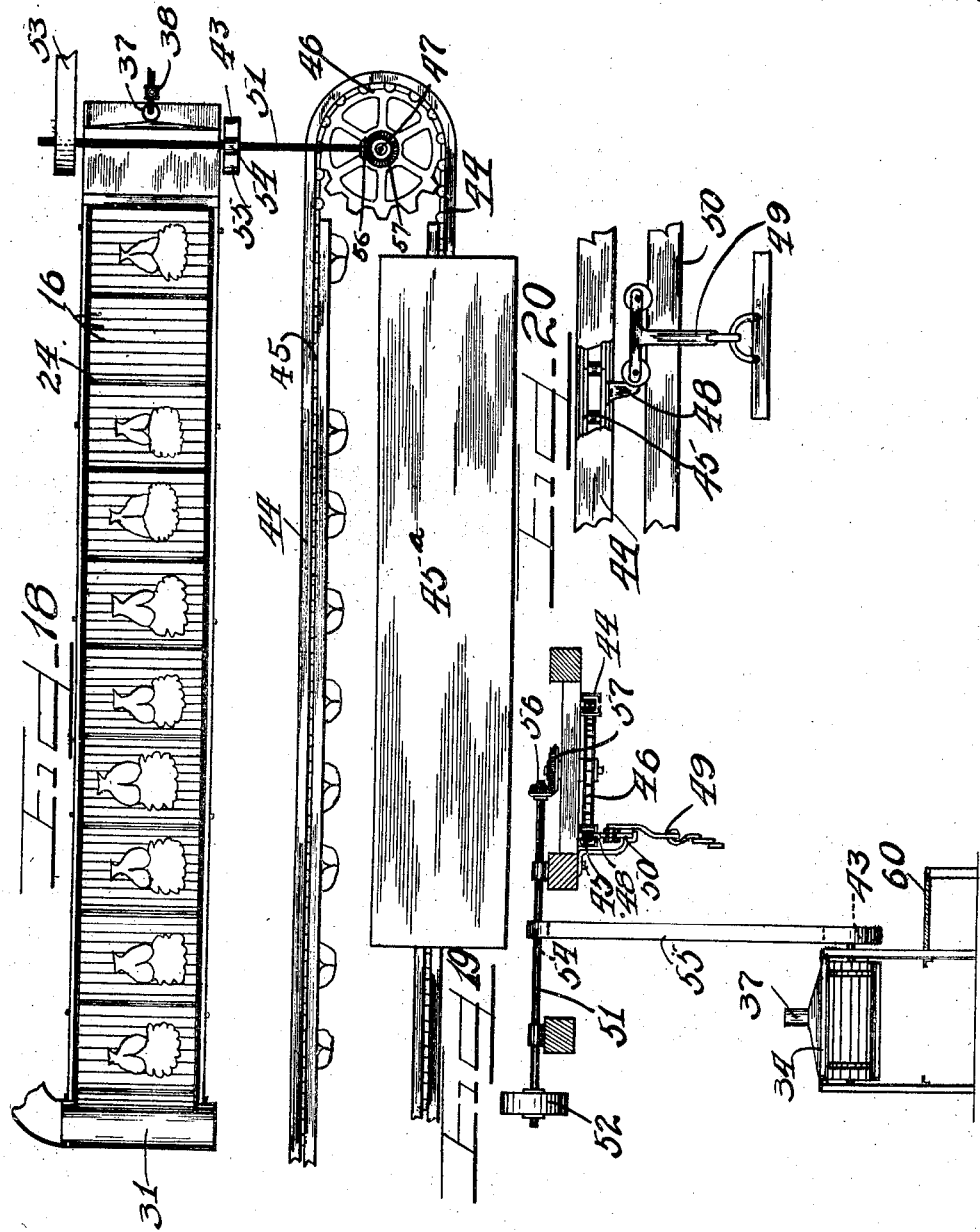

Patented Mar. 24, 1925.

1,531,060

UNITED STATES PATENT OFFICE.

WILLIAM B. ALLBRIGHT, OF CHICAGO, ILLINOIS, ASSIGNOR TO THE ALLBRIGHT-NELL CO., OF CHICAGO, ILLINOIS, A CORPORATION OF ILLINOIS.

CONTINUOUS VISCERA AND CARCASS INSPECTION MACHINE.

Application filed December 26, 1917. Serial No. 208,961.

*To all whom it may concern:*

Be it known that I, WILLIAM B. ALLBRIGHT, a citizen of the United States, and a resident of the city of Chicago, in the county of Cook and State of Illinois, have invented certain new and useful Improvements in a Continuous Viscera and Carcass Inspection Machine; and I do hereby declare that the following is a full, clear, and exact description of the same, reference being had to the accompanying drawings, and to the numerals of reference marked thereon, which form a part of this specification.

Heretofore in handling hogs in the packing plants, the hogs are opened and a set of inspectors make an examination of the viscera. If there appears to be any slight symptoms of a diseased viscera, the carcasses are tagged and sent to a room for a more careful and final examination. If the viscera are here found to be in healthy condition they must be returned from this room to be disposed of and also the carcasses must be returned to the main conveyor to be operated upon by the cutters. This system is objectionable in that it involves unnecessary labor and expense.

It is an object of my invention to provide an inspection table containing compartments each of which is adapted to receive a viscera therein in which the complete examination and inspection of the viscera may take place at one time and by one set of inspectors and in which the carcasses need not be shunted from the main line or conveyor.

It is furthermore an important object of my invention to provide a viscera inspection table and a carcass conveyor which are timed to move together so that the viscera on the table are opposite the respective carcasses from which taken so that in case of a diseased viscera, the inspector has the carcass of said diseased viscera opposite him so that the carcass can be tagged without moving from his inspection position.

It is further an object of my invention to provide a simultaneously movable viscera inspection table and carcass conveyor both of which advance at the same rate of speed so that both the viscera and carcass may be thoroughly inspected without shunting either on a side track unless a diseased one is found in which case it is shunted onto a side line to be disposed of as the inspector has directed.

It is further an object of my invention to provide a sanitary viscera inspection conveyor or machine in which each compartment is thoroughly sterilized after each viscera is dumped prior to receiving another viscera thereon.

It is further an object of my invention to provide a viscera inspection table or conveyor on which the viscera may be successively dumped and successively inspected and tagged so that the complete inspection and operation may take place at the same time without sending the hogs into a separate room and then returning the same.

It is further an object of my invention to provide a viscera conveyor table in which the conveyor is pushed along instead of pulled in order that the conveyor top may be kept tight to prevent any of the viscera or liquid from passing through the table formed by the conveyor.

The invention (in a preferred form) is illustrated in the drawings and hereinafter more fully described.

On the drawings:

Figure 1 is a top plan view of a device embodying my invention.

Figure 2 is a side elevation thereof.

Figure 3 is a transverse section taken through the machine looking toward the rear.

Figure 4 is a view of the front end of the machine with parts omitted and parts in section.

Figure 5 is a view of the discharge end of the machine.

Figure 6 is an enlarged fragmentary longitudinal section taken through the viscera conveyor table and the trough.

Figure 7 is an enlarged detail taken through the sterilizing tank with the conveyor in elevation.

Figure 8 is an enlarged detail of one of the steam and hot water spray-heads.

Figure 9 is an enlarged detail of the conveyor showing the same in side elevation.

Figure 10, is a top plan view thereof.

Figure 11, is an enlarged section taken through one of the sections of the conveyor and one of the lags or walls.

Figure 12 is a section taken through one of the conveyor sections or pans provided with a partition wall.

Figure 13 is a sectional detail illustrating a modified form of dividing wall.

Figure 14 is a somewhat similar view showing the track rollers sunk into the wall.

Figure 15 is an enlarged fragmentary detail of Figure 14, taken at right angles thereto.

Figure 16 illustrates a hinged flap for the discharge trough.

Figure 17 is an enlarged detail showing one of the springs for the door.

Figure 18 is a top plan view of a viscera inspection table and carcass conveyor embodying my invention.

Figure 19 is a section taken through the viscera table and carcass conveyor looking toward the drive end of the machine with parts in elevation.

Figure 20, is an enlarged fragmentary detail of one of the gambrel carriages and conveyor chains.

As shown on the drawings:

A supporting frame is provided which is constructed of upright angle bars 1, which are connected by longitudinal angle bars 2—3—4, and transverse angle bars 5. Secured to the frame thus formed at opposite ends thereof are shafts 6—7, the shaft 6, being journalled in stationary bearings 8, and the shaft 7, being journalled in adjustable bearings 9, movable in guide bars 10—11, and a screw shaft 12, is provided for adjusting said bearings which threads through a rigid nut 13.

Secured on each of the shafts 6—7, is a set of sprocket wheels 14—15, around which the chains of the horizontal viscera conveyor table are trained.

Said conveyor comprises sections or flights 16, constructed of sheet metal each of which has its ends 17, turned upwardly as shown in Figure 9—10. Rigidly secured to each end of each section is a link 18, having an outturned flange 19, which is secured to the sections. Each set of links has slightly elongated aligned apertures 20, in which engages the pintle 21, of rollers 22, which serves to connect the links into a sprocket chain and connects the flights into a conveyor.

Secured to certain of said sections 16, as shown, every seventh one is a wall or partition member 23 or 24, (see Figures 11 and 13) which as shown, is either riveted or secured thereto by screws and after which the entire section and wall is provided with a galvanized coating 25, which provides a sanitary construction and one in which there are no cracks for juices to run into and become contaminated. These ribs or walls 23—24, divide the conveyor into viscera receiving compartments or pans. Also secured to each rib or wall is a pair of rollers 26, which may project outwardly as shown in Figure 13, or may be sunk into the rib as shown in Figures 14 and 15. These rollers are adapted to rest on tracks 27—28, formed of a T-rail secured to the cross brackets 5, by angle irons. A bar 29, is secured to the frame on each side of the machine and journalled thereto are rollers 30, on which the ends 17, of the lower traveling sections are adapted to rest.

At the discharge end of the machine, a trough 31, is positioned in which the viscera are successively dumped and are delivered to a chute which delivers them to be separated and otherwise treated. Hinged to said trough is a flap or door 32, by means of spring hinges 33, which normally hold the door in the position shown in Figure 6, but permits the door being depressed by the ribs or walls 23—24, and automatically swipes over the ribs and prevents any of the viscera being carried by the ribs beyond the trough.

At the forward or receiving end of the viscera conveyor is secured a sterilizing tank 34, through which the forward shaft 6, extends and the forward sprocket wheels 14—15, are in said tank. The tank is provided with apertures for the upper and lower rim of the conveyor and suitable flaps or doors 35—36, are secured to the tank to maintain the apertures closed except for the space occupied by the conveyor. These flaps may be a piece of stiff belting or a suitable sheet may be hinged to the tank.

The tank is provided with a discharge pipe 37, for the fumes which may be drawn out by a steam jet or forced draft delivered through a pipe 38, provided with a suitable valve. A cold water pipe 39, extends transversely through the tank adjacent the lower lap of the conveyor and is apertured to spray a washing jet upon the conveyor. In advance of the cold spray pipe 39, is a steam and hot water spray pipe 40, by means of which steam and a hot water jet are sprayed on the conveyor to thoroughly sterilize the same. A cold water spray pipe 41, is provided adjacent the upper lap which washes any clinging particles from the conveyor prior to its leaving the tank. A drain or discharge pipe 42, is provided for said tank.

The conveyor is operated by a drive wheel 43, connected to shaft 6, outside the tank by means of which the sprockets 14—15, and said shaft 6, are driven to impart a drive to the conveyor.

As shown in Figures 18 to 20, inclusive, the viscera table and carcass conveyor are constructed to operate together, and as shown, a conveyor track 44, is provided which leads from a carcass cleaning and dehairing machine 45ª, of a well known construction, as for instance, any of the Kohlhepp carcass scraping and dehairing machines. Traveling in said track 44, is a conveyor chain 45, trained at one end around a sprocket wheel 46, on a shaft 47. Said sprocket chain 45, has depending pushers or fingers 48, secured thereto, each of which engages a carcass carrying gambrel carriage 49, traveling on a rail 50.

A horizontal drive shaft 51, is journalled above said machine and is provided on one end with a drive pulley 52, driven by a belt 53 from any suitable source of power.

Secured to said drive shaft 51, is a small pulley 54, around which and the drive wheel 43, on the viscera conveyor shaft 6, a belt 55, is trained.

On the inner end of shaft 51, a bevel pinion 56, is secured which meshes with a bevel gear 57, on shaft 47, for driving the carcass conveyor.

A platform 60, is provided between the machines for the inspectors to stand on.

The operation is as follows:

From the description, it is seen that the inspection table forms a traveling and endless table or conveyor, which is divided into a plurality of independent compartments or pans, into each of which is dumped an individual viscera. This is accomplished by having the hogs pass adjacent the receiving end of the table where an operator removes the viscera and dumps it into one of these compartments. This is a continuous operation, during the kill, so that the successive compartments are filled with a viscera from different animals. The conveyor, with the viscera in the several compartments, travels slowly along past the inspector, who stands by the side of the table and inspects the viscera. If the viscera are free from objection, they are passed on to be discharged and if traces of disease are found, they are tagged as they pass, as is also the carcass which is opposite the viscera on the carcass conveyor. The carcasses are also inspected by another inspector, so that both the viscera and carcasses are inspected.

The upper and lower run of the viscera conveyor table are supported on the tracks 27—28, by means of the rollers 22, and the sprocket wheels on the rear shaft 6, push the conveyor along. Owing to the elongated apertures in the links, the sections are pushed tightly together forming a very tight joint, preventing any of the viscera or fluid from dropping through the conveyor. All the sections are preferably galvanized to provide a sanitary construction.

After the viscera are dumped, the conveyor is rotated through sterilizing chamber 34, in which the steam, hot and cold water thoroughly sterilizes and cleanses the conveyor preparatory to the same rotating into position to receive other viscera thereon.

Any suitable steam or air blast may be delivered through pipe 37, to convey the fumes through the sterilizing compartment. Many modifications may be made, and details of construction may be varied through a wide range, and I therefore do not purpose limiting the claims to the specific construction shown but purpose claiming broadly a viscera inspection conveyor or table, and a viscera inspection table and carcass conveyor acting conjointly to move carcasses and viscera abreast for the purposes specified.

I claim as my invention:

1. In a device of the class described a viscera inspection conveyor comprising a plurality of sections, a sprocket chain connecting the sections adapted to permit relative longitudinal movement of the sections, means for pushing the sections to form the upper lap of the conveyor adapted to force the sections tightly together to form tight joints between the sections, ribs secured to some of the sections dividing the conveyor into compartments, rollers secured to the ribs, and tracks on which the rollers rest to support the upper and lower laps of the conveyor.

2. In a device of the class described a viscera conveyor comprising a plurality of sections, a sprocket chain connecting the sections adapted to permit relative longitudinal movement of the sections, means engaging said rollers for pushing the sections to form the upper lap of the conveyor adapted to force the sections tightly together to form tight joints between the sections, ribs secured to some of the sections dividing the conveyor into compartments, rollers secured to the ribs, tracks on which the rollers rest to support the upper and lower laps of the conveyor, a discharge trough at one end of the conveyor, means forming a part of said trough adapted to project into said compartments to assist in removing viscera therefrom, and sterilizing means at the opposite end of the conveyor.

3. In a device of the class described, an inspection table comprising independent sections connected to move together, means secured to some of said sections dividing the table into independent trays for receiving viscera therein, a trough into which the viscera are dumped from the trays, and yielding members secured to the trough adapted to contact the means to prevent viscera being carried past the trough.

4. A viscera inspection table comprising endless chains, straight edged cross members secured thereto, ribs secured to some of said cross members dividing the table into compartments, and means for pushing the cross members tightly against one another into abutting relation to form liquid tight compartments for receiving viscera.

5. A viscera inspection table comprising independent flights having straight margins and the ends thereof bent to form flanges, means connecting said flights, ribs provided on some of said flights, and a driving mechanism engaged with said means adapted to push said flights tightly together into abutting relation to form liquid tight compartments for receiving viscera.

6. An inspection device comprising a plurality of flights, links rigidly secured to said flights and pivotally connected one to the other, rollers supported on said links, driving means engaging said rollers to cause said flights to be pushed tightly against one another, and members secured to some of said flights dividing the device into compartments.

7. A viscera inspection table including a series of isolated retaining trays, said trays serially connected together to form an endless platform conveyor, means to support and drive the conveyor, and means to sterilize the trays prior to reuse.

8. A conveyor for viscera, comprising isolated retaining trays, means for moving said trays horizontally in one direction with their open faces up and along a lower path in the opposite direction with their open faces down, and means located below the lowest position of the trays for injecting cleaning and sterilizing agents into them.

9. A sanitary method of handling meat which consists in conveying carcasses and their respective viscera synchronously, so that each carcass always maintains a definite position with respect to its respective viscera, and isolating each viscera from the others while being conveyed.

10. A sanitary method of handling meat which consists in conveying carcasses and their respective viscera synchronously, so that each carcass always maintains a definite position with respect to its respective viscera, isolating each viscera from the others while being conveyed, and sterilizing the conveying means after each operative movement thereof.

11. A sanitary method of handling freshly killed animals which comprises removing the viscera from the carcasses; conveying the eviscerated carcasses and their removed viscera in substantial proximity to each other through an inspection space so that the related carcasses and viscera may be readily identified; and isolating each viscera from the others while being conveyed.

12. A sanitary method of handling freshly killed animals which comprises removing the viscera from the carcasses; conveying the eviscerated carcasses and their removed viscera in substantial proximity to each other through an inspection space so that the related carcasses and viscera may be readily identified; isolating each viscera from the others while being conveyed; and sterilizing the conveying means after each operative movement thereof.

In testimony whereof I have hereunto subscribed my name in the presence of two subscribing witnesses:

WILLIAM B. ALLBRIGHT.

Witnesses:
FRANK A. BREMER, Jr.,
CHARLES W. HILLS, Jr.